(12) United States Patent
Stancheva et al.

(10) Patent No.: US 7,650,627 B1
(45) Date of Patent: Jan. 19, 2010

(54) ABSTRACT CONFIGURATION FILES FOR EFFICIENT IMPLEMENTATION OF SECURITY SERVICES

(75) Inventors: Svetlana Stancheva, Ajtos (BG); Jako Blagoev, Varna (BG); Ekaterina Zheleva, Sofia (BG); Ilia Kacarov, Sofia (BG); Stephan Zlatarev, Stara Zagora (BG); Hiltrud Jaeschke, Muenster (DE)

(73) Assignee: SAP AG, Walldorf (DE)

( * ) Notice: Subject to any disclaimer, the term of this patent is extended or adjusted under 35 U.S.C. 154(b) by 515 days.

(21) Appl. No.: 10/857,075

(22) Filed: May 28, 2004

(51) Int. Cl.
*G06F 17/00* (2006.01)
*G06F 7/04* (2006.01)
*G06F 17/30* (2006.01)
*H04N 7/16* (2006.01)
*G06F 21/00* (2006.01)
*G06F 11/30* (2006.01)
*G06F 12/14* (2006.01)
*B41K 3/38* (2006.01)

(52) U.S. Cl. .............................. 726/1; 726/26; 713/182; 713/189; 380/59

(58) Field of Classification Search ....................... 726/1
See application file for complete search history.

(56) References Cited

U.S. PATENT DOCUMENTS 6,044,466 A * 3/2000 Anand et al. .................... 726/1
6,128,774 A * 10/2000 Necula et al. ................ 717/146
6,158,010 A * 12/2000 Moriconi et al. ................ 726/1
6,363,488 B1 * 3/2002 Ginter et al. .................... 726/1
6,658,571 B1 * 12/2003 O'Brien et al. ................ 726/26
6,678,700 B1 * 1/2004 Moore et al. ................. 707/200
7,028,336 B2 * 4/2006 Wesinger et al. .............. 726/11
7,073,073 B1 * 7/2006 Nonaka et al. .............. 713/193
7,269,612 B2 * 9/2007 Devarakonda et al. ...... 707/205
2002/0188869 A1 * 12/2002 Patrick ....................... 713/201

FOREIGN PATENT DOCUMENTS

WO         WO 0102968 A1 * 1/2001

* cited by examiner

*Primary Examiner*—Nasser G Moazzami
*Assistant Examiner*—Oscar A Louie
(74) *Attorney, Agent, or Firm*—Blakely Sokoloff Taylor & Zafman, LLP (57) ABSTRACT

A method is described that involves identifying a configuration file in response to a desire to obtain security services. The configuration file describes a security policy tailored for use in the environmental condition set under which the desire arose. The identifying is based upon at least a portion of the environmental condition set. The method also involves using information found within the configuration file to configure code that performs authentication and authorization services so that the code will implement the security policy.

26 Claims, 7 Drawing Sheets

ABSTRACT CONFIGURATION FILES FOR EFFICIENT IMPLEMENTATION OF SECURITY SERVICES

FIELD OF INVENTION

The field of invention relates generally to the software arts; and, more specifically, to abstract configuration files for efficient implementation of security services.

BACKGROUND

Security Services

Authentication is the process of verifying that a person or thing (e.g., computing system) is the person or thing that he/she/it claims to be. Authentication is used to ensure that from amongst all the persons and/or things that request access to specific resources of software (e.g., applications, data files, etc.) only those persons or things that are approved to have such access are actually granted such access. The classic example of an authentication service is a module of software designed to ask a client for a userid and password.

Figure 1A:
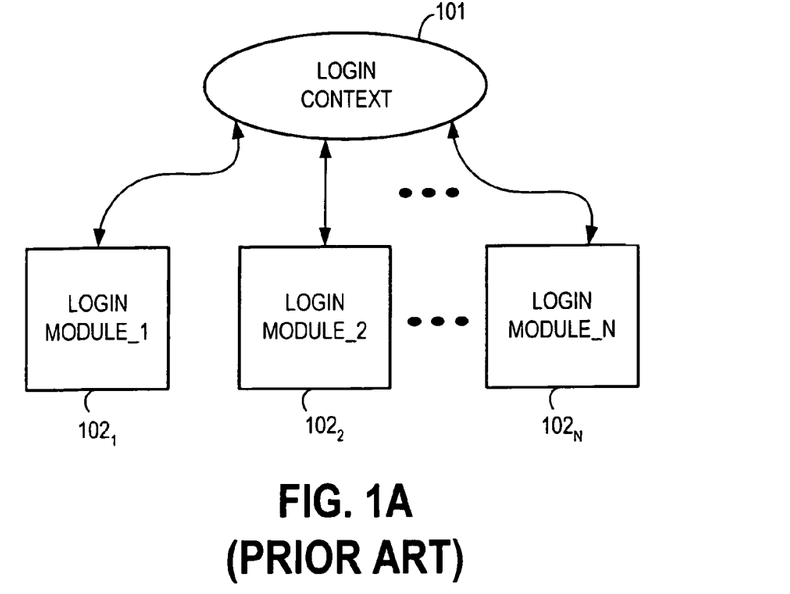
FIG. 1A (prior art) shows an authentication service architecture.

Different types of authentication processes and procedures exist (e.g., Relational Database Management Systems (RDBMS) Authentication, Kerberos, Biometric Authentication, Unix Authentication, Windows NT authentication, etc.). FIG. 1A shows an architecture that is capable of performing a particular type of authentication process from amongst a plurality of available authentication services. The authentication service includes a login context 101 and a collection of login modules $102_1$ through $102_N$.

The login context 101 knows or understands which login module amongst login modules $102_1$ through $102_N$, is appropriate for the situation; and, causes the appropriate login module to be used to authenticate the user. Here, each login module can be viewed as corresponding to a different type of authentication process. For example, login module $102_1$ may be a module of software for executing RDBMS authentication processes, login module $102_2$ may be a module of software for executing Kerberos authentication processes, login module $104_3$ may be a module of software for executing Biometric authentication processes, etc. If the login context 101 views Kerberos authentication procedures to be appropriate for the situation, the login context 101 invokes the Kerberos authentication module $102_2$ to authenticate the user.

An invoked login module executes its specific type of authentication process (e.g., with the help of a callback handler (not shown in FIG. 1), asks for a userid and password in accordance with a specific format). If it is determined that the user has provided acceptable credentials to verify himself/herself/it, and if the verified user has been cleared for access, a favorable response is sent to the login context 101 by the invoked login module. The login context 101, in turn, favorably reports to whatever entity initially requested the services of the authentication service.

Authorization is the process by which users (in many cases authenticated users) are permitted access to certain, specific software resources (e.g., applications, files, etc.) while being denied access to other certain, specific software resources. That is, authorization is the process that determines the scope of resources that a user is to be given access to. In a typical case, once a login module has verified the identity of a user, it passes the identity of the user to the authorization service. The authorization service verifies whether or not the user has the authority to reach each resource that the user attempts to reach.

Often, "principle information" is created for the user that is based on the authentication information collected by the login module (e.g., the user's password). Principle information is any information that identifies a user. Authorization (i.e., the process of determining whether or not a user has the authority to reach a protected area of software) is performed by correlating the user's principle information to the software resources that the user has been approved for access to.

Figure 1B:
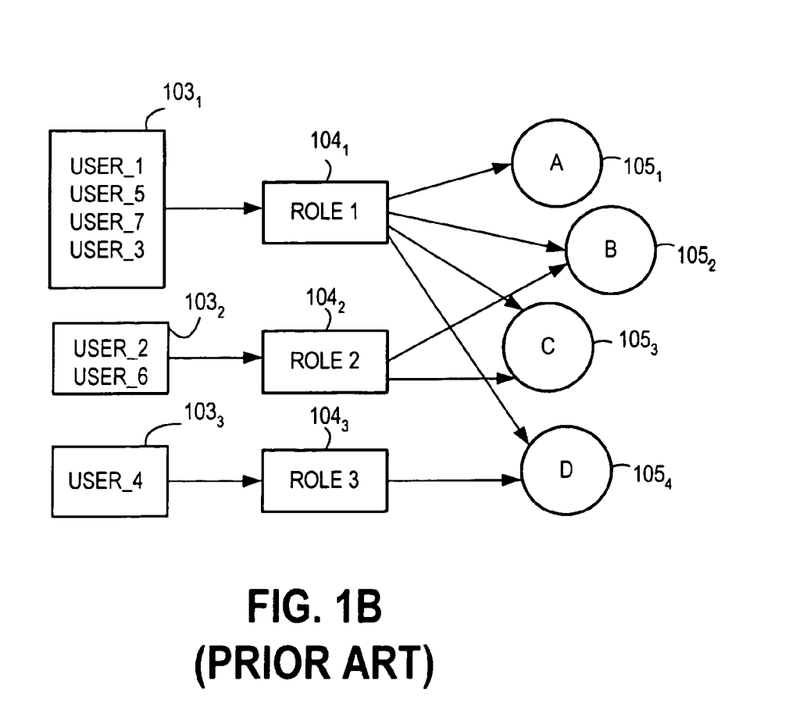
FIG. 1B (prior art) shows an authorization service architecture.

FIG. 1B shows a prior art authorization service architecture capable of performing the aforementioned correlation. The architecture of FIG. 1B is best understood by working "backwards" from right to left. Software resources $105_1$ through $105_4$ represent those resources of software that the authorization service exercises access control over. These resources could be, for example, files in a database or applications within a container. Roles are then defined for each different combination of software resources that at least one user has been qualified to access.

According to the exemplary depiction of FIG. 1B, three different roles $104_1$ through $104_3$ are observed. The first role $104_1$ permits access to all four resources $105_1$ through $105_4$. The second role $104_2$ permits access to resources $105_2$ and $105_3$. The third role $104_3$ permits access only to resource $105_4$. According to the configuration illustrated in FIG. 1B, users 1, 3, 5 and 7 are to be permitted access to all four resources $105_1$ through $105_4$. As such, the principle information $103_1$ for users 1, 3, 5 and 7 are correlated to role 1 $104_1$.

During operation, if any of users 1, 3, 5 or 7 attempts to access any of the software resources $105_1$ through $105_4$, the user's principle information is forwarded to the authorization service. The authorization service identifies a match within principle information $103_1$ and correlates the match to role 1 $104_1$; which, in turn, allows access to any of resources $105_1$ through $105_4$. Operation for users 2 and 6 works in a similar fashion to regulate access only to resources $105_2$ and $105_3$; and, likewise, operation for user 4 works in a similar fashion to regulate access only to resource $105_4$. Role based authorization schemes are efficient for situations, such as that depicted in FIG. 1B, where multiple users are to be assigned identical access roles. That is, the role only needs to be articulated once and the various users are simply assigned to the role.

Component Based Software Architectures

Component based software environments use granules of software (referred to as "components" or "component instances") to perform basic functions. Some examples of component based architectures include Java Beans (JB), Enterprise Java Beans (EJB), Common Object Request Broker Architecture (CORBA), Component Object Model (COM), Distributed Component Object Model (DCOM) and derivatives there from.

The functional granularity offered by a plurality of different components provides a platform for developing a multitude of more comprehensive tasks. For example, a business application that graphically presents the results of calculations made to an individual's financial records (e.g., amortization of interest payments, growth in income, etc.) may be created by logically stringing together: 1) an instance of a first component that retrieves an individual's financial records from a database; 2) an instance of a second component that performs calculations upon financial records; and, 3) an instance of a third component that graphically presents financial information.

Moreover, within the same environment, another business application that only graphically presents an individual's existing financial records may be created by logically stringing together: 1) another instance of the first component mentioned just above; and, 2) another instance of the third component mentioned above. That is, different instances of the same component may be used to construct different applications. The number of components within a particular environment and the specific function(s) of each of the components within the environment are determined by the developers of the environment.

Components may also be created to represent separate instances of persistent data (e.g., a first component that represents a first row of database information, a second component that represents a second row of database information, etc.) or items of text for web pages or servlets.

Components of like kind (e.g., components used to implement business logic applications, components used to implement web pages or servlets) are often "kept" in a container. A container defines the operating environment of its member components and is often configured to provide various services for its components and/or the applications/pages/servlets that are constructed from them.

SUMMARY

A method is described that involves identifying a configuration file in response to a desire to obtain security services. The configuration file describes a security policy tailored for use in the environmental condition set under which the desire arose. The identifying is based upon at least a portion of the environmental condition set. The method also involves using information found within the configuration file to configure code that performs authentication and authorization services so that the code will implement the security policy.

FIGURES

The present invention is illustrated by way of example and not limitation in the figures of the accompanying drawings, in which like references indicate similar elements and in which.

DETAILED DESCRIPTION

An authentication policy can be viewed as the set of one or more login modules that are made available for use by a login context. An authorization policy can be viewed as a set of software resources, the set of roles that have been articulated for accessing the software resources; and, the set of principles that have been correlated to these roles. A security policy includes an authentication policy and an authorization policy.

In the case of component based software environments, problems may arise at least if a security service is designed to support more than one container because different containers may need to enforce different security policies. Moreover, different security policies may need to be implemented depending on the manner in which a container is accessed. For example, a first application program interface (API) may require the use of a first security policy and a second API may require the use of a second security policy.

Similarly, a first communication session (e.g., a telnet session) may require a first security policy and a second communication session (e.g., an Hypertext Transfer Protocol (HTTP) session) may require a second security policy. Further still, as situations change, the collection of workable security policies may need to be modified (e.g., by modifying an existing security policy, deleting a security policy, adding a new security policy, etc.).

Figure 2A:
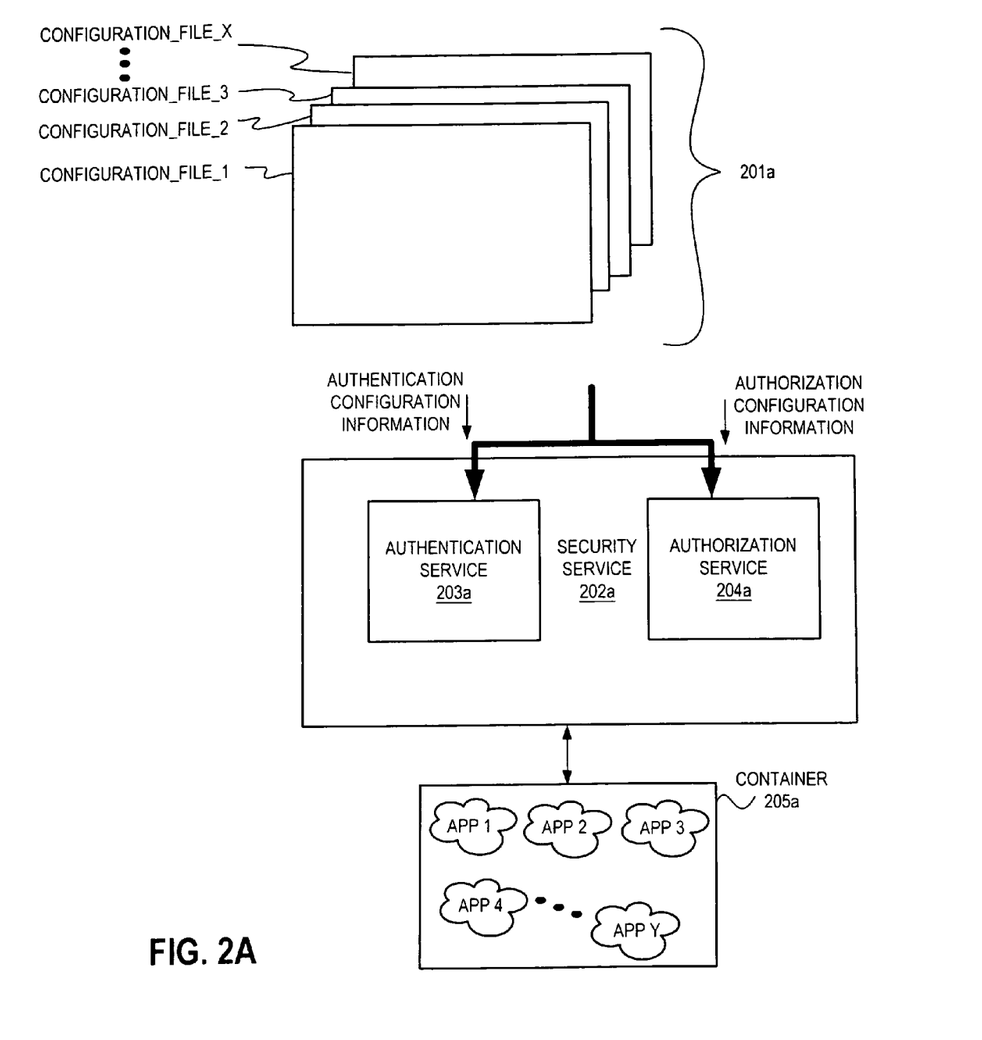
FIG. 2A shows a security service embodiment that uses abstract configuration files in order to easily instantiate different applicable authentication and/or authorization service policies.

Since the above indicates that different security policies may need to be made workable, an architecture capable of easily changing and/or configuring the security policy to be applied will be helpful. FIG. 2A shows such an architecture. According to the architecture of FIG. 2A, a plurality of configuration files $201_a$ are created that describe a unique security policy. Any of these configuration files may be provided to (or referred to by) a security service $202_a$; and, as a consequence of the security service $202_a$ being provided (or being referred to) a particular configuration file, the security policy defined by the particular configuration file is implemented by the security service $202_a$.

The lifetime of a particular configuration file and its corresponding security policy by the security service may be quasi-permanent (e.g., in the sense that once a configuration file is selected from the set of available configuration files its corresponding security policy is implemented without change for extended periods of time (e.g., security policy changes are made only upon reconfiguration of the installed software)). On the other end of the spectrum, it is anticipated that "on-the-fly" security policy changes will be useful as well. On the fly security policy changes are rapid in the sense that the normal operation of the overall system (or cluster) is apt to demand different security policies to be used and reused over time. The security service architecture of FIG. 2A is also capable of supporting "on-the-fly" security service changes.

In the architecture of FIG. 2A, each of the configuration files 201a are akin to input information and the actual code for performing security services is represented by block 202a. The code responsible for performing security services includes code for performing authentication services 203a and code for performing authorization services 204a. As such, referring to FIG. 3, a particular configuration file 301 may be made to include both a description of the authentication portion 302 of the security policy and a description of the authorization portion 303 of the security policy.

Figure 3:
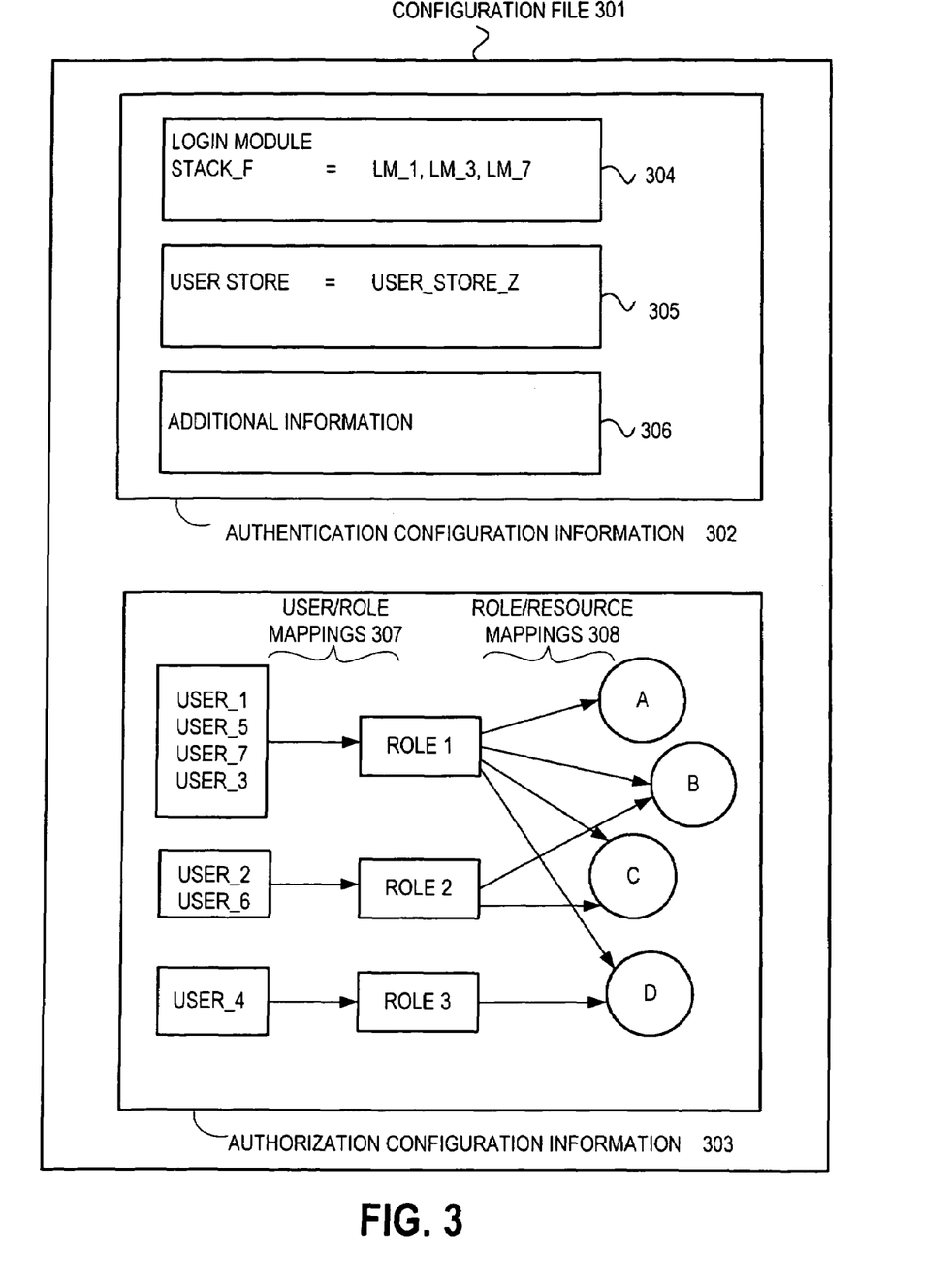
FIG. 3 shows an embodiment of a security policy configuration file.

Referring to FIGS. 2 and 3, the information in the authentication part 302 of the configuration file 301 is used by the code 203a that performs authentication services; and, the information in the authorization part 303 of the configuration file 301 is used by the code 204a that performs authorization services. In an embodiment, the code that performs the authentication services 203a is constructed to implement the architecture of FIG. 1A and the code that performs the authorization services 204a is constructed to implement the architecture of FIG. 1B. A description of the relevance of the information found in the authentication part 302 and the authorization part 303, respectively, in the configuration file 301 is provided below. Security services code 202a is also responsible for identifying the appropriate configuration file for the given situation (e.g., a first telnet session requires a first configuration file, a second HTTP session requires a second configuration file, a third request from a third container requires a third configuration file, etc.). Here, security service portion 202a may be designed to have or at least refer to some form of look-up table for identifying the correct configuration file in light of the applicable conditions.

In the embodiment of FIG. 3, the information in the authentication portion 302 of the configuration file 301 includes: 1) the identity of the appropriate login modules 304; 2) the identity of the appropriate user store 305; and, 3) additional information 306. The identity of the appropriate login modules is essentially a listing of the authentication service's login module stack. The particular embodiment of FIG. 3 shows the appropriate login module stack as including login modules 1, 3 and 7. Given that a first security policy configuration may have a first set of potential login techniques to implement; while, a second security policy configuration may have a second set of potential login techniques to implement; then, it makes sense that the configuration file for the first security policy configuration would include a listing of the login modules needed to implement the first set of potential login techniques; while, the configuration file for the second security policy configuration would include a listing of the login modules needed to implement the second set of potential login techniques.

Note that in a typical environment the login module stack information 304 contained in the authentication part 302 of the configuration file 301 does not include the login modules themselves; but rather, simply contains an identification of the login modules. That is, the actual login modules that contain code for performing different types of authentication services are actually located somewhere other than the configuration file. For example, the login modules could be found inside the authentication service code 203a or could be made accessible to the authentication service code 203a. In the later case, the authentication service 203a would be provided the actual login modules called out by the login module information 304 found in the configuration file 301 so that they could be used to implement an authentication service that is consistent with the security policy being implemented (e.g., the login modules could be fetched, downloaded, etc. to the authentication service code 203a).

Figure 2B:
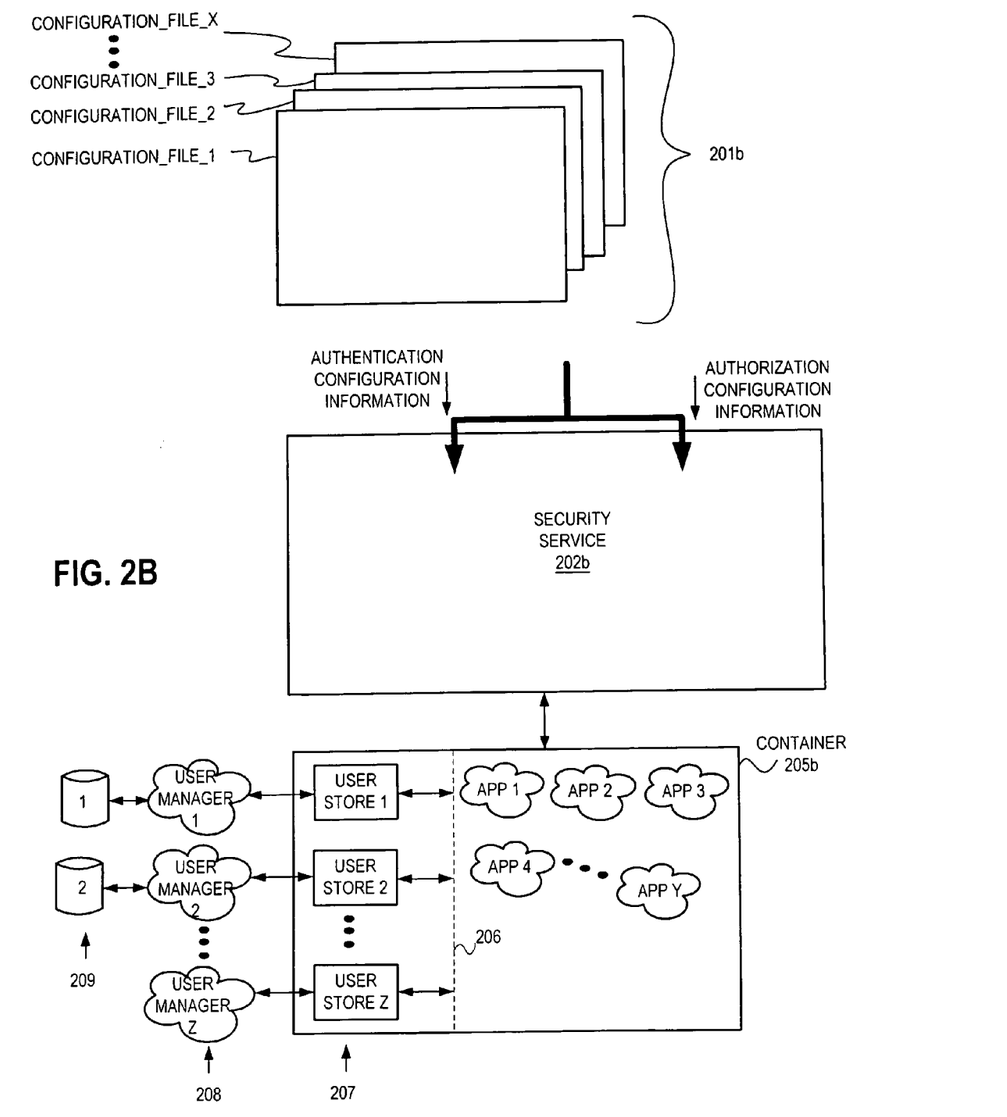
FIG. 2B shows a security service embodiment that uses abstract configuration files in order to easily instantiate different applicable authentication and/or authorization service policies.

In another or related approach, shown in FIG. 2B, user stores 207 and user managers 208 correspond to the locations where authentication and authorization code exists for the purposes of performing security services. As such, security service portion 202b serves mostly to identify the correct configuration file (e.g., based on the surrounding circumstances) and to provide the configuration file's information to the user store(s) and user manager(s).

A user store is a module of software that is used by a container to interface to a user manager that resides outside the container. A user manager is another term for a security service that performs authentication and authorization services. According to the depiction of FIG. 2B, user stores 1 and 2 are used to interface to user managers 1 and 2, respectively. User managers 1 and 2 manage the authentication and authorization services that control access to resources 1 and 2 209, respectively. Resources 1 and 2 could be, for example, separate databases that are separately managed as to their security protection.

User manager Z is the user manager for the container 205b itself. That is, user manager Z authenticates the users that desire to reach resources within the container. User manager Z also controls the access to the resources of the container amongst the container's authenticated user's (i.e., user manager Z also performs authorization services). User store Z is the user store that interfaces to user manager Z. The different user stores 207 provide a common API 206 to any of the container's resources (in particular, applications) that may request security services. As such, the resources only need to comprehend a single set of commands to invoke security services through any/all of the user stores.

Each of the user stores effectively behaves as a translator between the common API 206 and the particular user manager that it is configured to communicate with. Here, it is to be understood that the different user managers may not "speak the same language". That is, the user managers may have different command syntaxes (e.g., a first user store might have "mg" as a modify user group command while a second user manager may have "modify_user_manager"). As such, a particular user store is at least configured to translate user configuration commands sent over the common API 206 (e.g., add user, delete user, modify user group, delete user group, create user group, etc.).

In an embodiment, each of the individual user stores are also configured to instantiate its own authentication login module stack for purposes of communicating with its corresponding user manager during an authentication session with a user that seeks access to the resources protected by the user manager. That is each user store is capable of maintaining its own authentication service structure such as the structure originally depicted in FIG. 1A. The login modules may, for example, send login and password information from the user store to its corresponding user manager. The user store may also receive a user's principle information so that same user can later access the same set of resources that are protected by the user store's user manger.

Referring to the configuration file 301 of FIG. 3, note that the authentication information 302 identifies the proper user store 305 to use for the present situation. For example, if a user attempts to access container 205b through a telnet session, the container invokes security service portion 202b. Recognizing that the applicable condition concerns a telnet session into container 205b, security service portion identifies the proper configurations file. In this case, the proper configuration file will identify user store Z in information field 305 because user manager Z is responsible for the security services that protect the contents of container 205b. The login module stack information field 304 will also identify the set of login modules that could be invoked as a consequence of a user attempting to reach inside container through a telnet session.

In response to the receipt of this information, the container directs is attention to user store Z for security services; and, user store Z configures itself with the particular login modules identified by the configuration file. If a second user attempts to access the container through an HTTP session, again the user will refer to security service portion 202 which identifies the correct configuration file for the situation. Here, the situation is different than before in that an HTTP session is involved rather than a telnet session. As such, a different configuration file may be identified as being appropriate for the HTTP session as compared to the telnet session. The configuration file for the HTTP session will still identify user store Z in information field 305 (because the container is attempting to be accessed). However, a different set of login modules may be identified for the login module stack (i.e., the HTTP session could involves a different set of authentication techniques than the telnet session).

Continuing with the above example assume that the first user (e.g., through the application of container 205b that the first user is using) wishes to access resource 1 of resources 209; and, that the second user (e.g., through the application of container 205b that the second user is using) wishes to use resource 2 of resources 209. In response to the first situation (e.g., application X desires access to resource 1), the security service portion 202 identifies the proper configuration file. In this case, the user store information field 305 of the configuration file will identify user store 1 and the login module stack information 304 will be whatever login module stack is appropriate for the situation of the first user's attempt to reach resource 1. User store 1 configures itself with the actual login module code identified by the module stack information 304 of the configuration file.

In response to the second situation (e.g., the second user through application Y desires access to resource 2), the security service portion 202 identifies the proper configuration file. In this case, the user store information field 305 of the configuration file will identify user store 2 and the login module stack information 304 will be whatever login module stack is appropriate for the situation of the second user's attempt to reach resource 2. User store 2 configures itself with the actual login module code identified by the module stack information 304 of the configuration file. The authentication information 302 of the configuration file 301 embodiment of FIG. 3 also includes additional information 306. In an embodiment, the additional information 306 corresponds to key-value string pairs that may be used to associate data or meta-data to the login module stack identified by the configuration file. For example, a realm name for the login module stack.

The configuration file embodiment 301 of FIG. 3 also includes authorization information 303 that identifies the roles 308 (i.e., identifies for each defined role what resources are to made available) and identifies each user group that maps 307 to a particular role. The applicable authorization service (e.g., authorization service 204 of FIG. 2A or whichever user manager of FIG. 2B is being targeted), uses the configuration file as input information for actually performing authorization services consistently with the security policy defined by the configuration file. Note that different roles and user mappings to them can be defined for a common set of resources depending on the situation. For example, user access to the container 205b via the Internet may cause a first set of roles and user mappings to be defined for user manager Z while user access to the container 205b via a corporate intranet may cause a second set of roles and user mappings to be defined.

Figure 4:
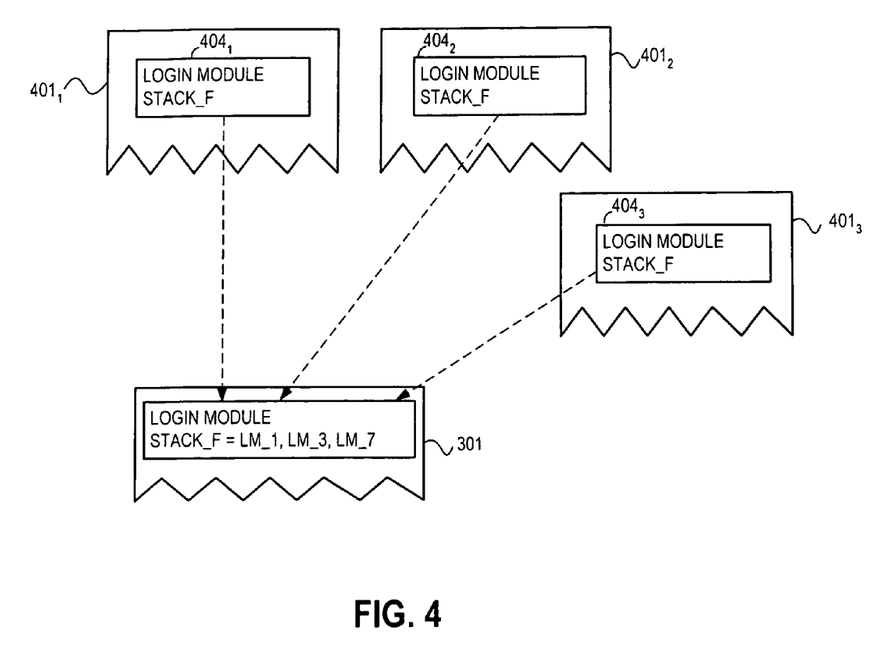
FIG. 4 shows that administrative efficiency can be gained through the use of templates within various security configuration files.

FIG. 4 demonstrates that the burden of configuration file administration and definition can be lessened by allowing the configuration files to reference other configuration files. For example, the login module stack portion of configuration file 301 is shown in FIG. 4 as including the definition of a particular login module stack that contains login modules 1, 3 and 7. This login module stack is identified as login module stack "F". Other configuration files $401_1$ through $401_3$ essentially need to articulate the same combination of login modules that login module stack F articulates. As such, rather than re-define the same information, configuration files $401_1$ through $401_3$ simply make reference to "login module stack F". The reference may be made by name only or may actually make reference to configuration file 301.

Figure 5:
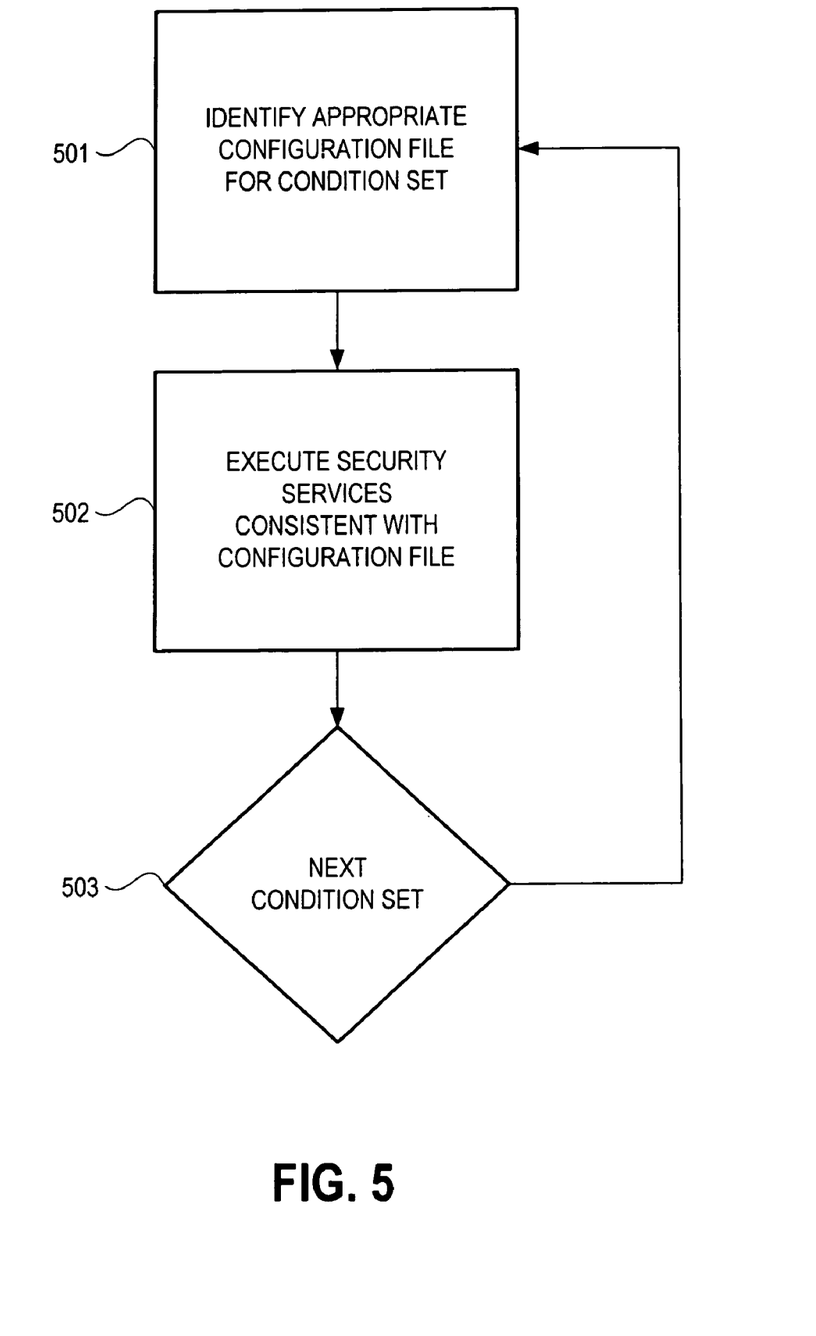
FIG. 5 shows a methodology for changing an applicable security service policy by changing a security policy configuration file.

FIG. 5 shows a methodology taught by the teachings above. According to the methodology of FIG. 5, a configuration file that is appropriate for a condition set is identified 501. Then, security services are executed 502 consistently with the security policy defined by the configuration file. Upon a new condition set 503, the process repeats. Of course, different configuration files are expected to identified over the course of a number of iterations.

A condition set is any characteristic of the environment under which the security services have been requested. For example, any of the following items may be used to define a condition set: 1) a user or group of users that desire information protected by the security service; 2) a communication session or communication session type over which requests for protected information and/or the protected information itself is to travel; 3) an application or group of applications that are designed to access protected information; 4) a protected component or group of protected components in a component based architecture to which access is requested; 5) a particular container, etc.

The security service techniques described above may be performed upon a server and/or the resources being protected may be located on a server. The server may be a Java 2 Enterprise Edition ("J2EE") server which supports Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, Compact Disc Read Only Memories (CD-ROMs), Digital Versatile/Video Disc Read Only Memories (DVD-ROMs), Erasable Programmable Read Only Memories (EPROMs), Electrically Erasable Programmable Read Only Memories (EEPROMs), magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 6:
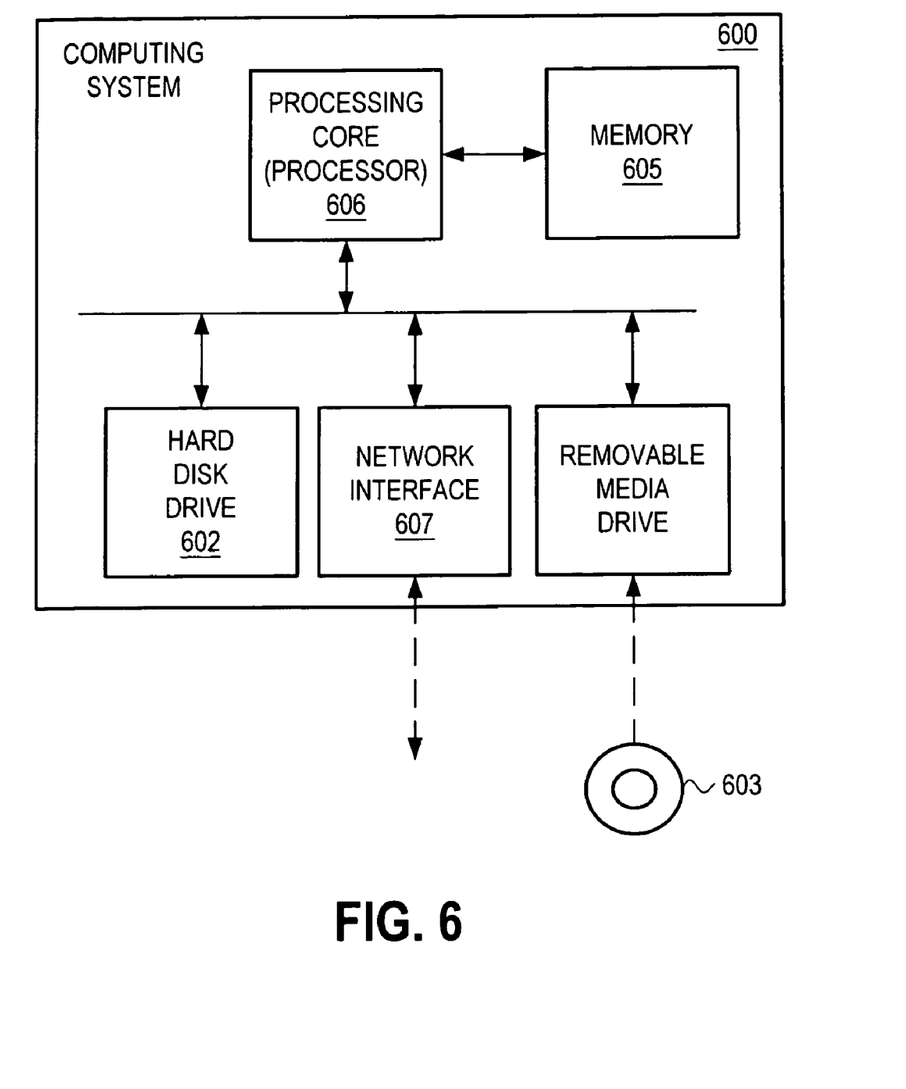
FIG. 6 shows an embodiment of a computing system.

FIG. 6 is a block diagram of a computing system 600 that can execute program code stored by an article of manufacture. It is important to recognize that the computing system block diagram of FIG. 6 is just one of various computing system architectures. The applicable article of manufacture may include one or more fixed components (such as a hard disk drive 602 or memory 605) and/or various movable components such as a CD ROM 603, a compact disc, a magnetic tape, etc. In order to execute the program code, typically instructions of the program code are loaded into the Random Access Memory (RAM) 865; and, the processing core 606 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   in an environment that is created by the execution of program code by one or more processors and that includes a first container of software applications and a second container of software applications, wherein said first container includes a plurality of services available for use by said software applications of said first container, and wherein said second container of software applications includes a second plurality of services available for use by said software applications of said second container:
   invoking security services in response to an attempt by a user, through a communication session between said user and an application within one of said containers, to gain access to a software resource that resides at a level that is higher than an operating system level;
   in response to said invoking, identifying a configuration file describing a security policy tailored for use in an environmental condition set under which said attempt arose, said identifying based upon at least a portion of said environmental condition set, said portion of said environmental condition set including at least one of:
      i) said communication session's type;
      ii) an application program interface (API) used to access said one container;
      iii) said one container's identity;
   using information found within said configuration file to engage the following for said user's access of said resource:
      a) a login module that is used to perform login procedures for said user during an implementation of an authentication component of said security policy;
      b) an authorization role that defines, for an authorization component of said security policy, which resources said user is permitted to reach during said session;
      c) a user store that controls access to said resource; and,
   implementing said security policy against said user by using said login module, said authorization role and said user store to access said software resource that resides at a level that is higher than an operating system level.

2. The method of claim 1 wherein said portion includes the identity of an application that desires access to a protected resource.

3. The method of claim 1 wherein said portion includes the identity of a component within a component based architecture.

4. The method of claim 1 wherein said communication session type is one of:
   i) an HTTP session;
   ii) a telnet session.

5. The method of claim 1 wherein said login module's program code is incorporated into said user store.

6. The method of claim 1 wherein said configuration file describes mappings of users to said role.

7. The method of claim 1 wherein said configuration file references another configuration file, said another configuration file describing a security policy for use under a different environmental condition set.

8. An article of manufacture including program code which, upon execution of said program code by one or more processors, causes a method to be performed, the method comprising:
   in an environment that includes a first container of software applications and a second container of software applications, wherein said first container includes a plurality of services available for use by said software applications of said first container, and wherein said second container of software applications includes a second plurality of services available for use by said software applications of said second container:
   invoking security services in response to an attempt by a user, through a communication session between said user and an application within one of said containers, to gain access to a software resource that resides at a level that is higher than an operating system level;
   in response to said invoking, identifying a configuration file describing a security policy tailored for use in an environmental condition set under which said attempt arose, said identifying based upon at least a portion of said environmental condition set, said portion of said environmental condition set including at least one of:
      i) said communication session's type;
      ii) an application program interface (API) used to access said one container;
      iii) said one container's identity;
   using information found within said configuration file to engage the following for said user's access of said resource:
      a) a login module that is used to perform login procedures for said user during an implementation of an authentication component of said security policy;
      b) an authorization role that defines, for an authorization component of said security policy, which resources said user is permitted to reach during said session;
      c) a user store that controls access to said resource; and,
   implementing said security policy against said user by using said login module, said authorization role and said user store to access said software resource that resides at a level that is higher than an operating system level.

9. The article of manufacture of claim 8 wherein said portion includes the identity of an application that desires access to a protected resource.

10. The article of manufacture of claim 8 wherein said portion includes the identity of a component within a component based architecture.

11. The article of manufacture of claim 8 wherein said communication session type is one of:
   i) an HTTP session;
   ii) a telnet session.

12. The article of manufacture of claim 8 wherein said login module's program code is incorporated into said user store.

13. The article of manufacture of claim 8 wherein said configuration file describes mappings of users to said role.

14. The article of manufacture of claim 8 wherein said configuration file references another configuration file, said another configuration file describing a security policy for use under a different environmental condition set.

15. A computing system comprising program code stored on an article of manufacture, wherein upon execution of said program code by said computing system a method is performed, said method comprising:
- in an environment that includes a first container of software applications and a second container of software applications, wherein said first container includes a plurality of services available for use by said software applications of said first container, and wherein said second container of software applications includes a second plurality of services available for use by said software applications of said second container:
- invoking security services in response to an attempt by a user, through a communication session between said user and an application within one of said containers, to gain access to a software resource that resides at a level that is higher than an operating system level;
- in response to said invoking, identifying a configuration file describing a security policy tailored for use in an environmental condition set under which said attempt arose, said identifying based upon at least a portion of said environmental condition set, said portion of said environmental condition set including at least one of:
  - i) said communication session's type;
  - ii) an application program interface (API) used to access said one container;
  - iii) said one container's identity;
- using information found within said configuration file to engage the following for said user's access of said resource:
  - a) a login module that is used to perform login procedures for said user during an implementation of an authentication component of said security policy;
  - b) an authorization role that defines, for an authorization component of said security policy, which resources said user is permitted to reach during said session;
  - c) a user store that controls access to said resource; and,
- implementing said security policy against said user by using said login module, said authorization role and said user store to access said software resource that resides at a level that is higher than an operating system level.

16. The computing system of claim 15 wherein said portion includes the identity of an application that desires access to a protected resource.

17. The computing system of claim 15 wherein said portion includes the identity of a component within a component based architecture.

18. The computing system of claim 15 wherein said communication session type is one of:
  - i) an HTTP session;
  - ii) a telnet session.

19. The computing system of claim 15 wherein said configuration file describes mappings of users to said role.

20. The computing system of claim 15 wherein said configuration file references another configuration file, said another configuration file describing a security policy for use under a different environmental condition set.

21. An apparatus, comprising:
- in an environment created by the execution of program code instructions by one or more processors and that includes a first container of software applications and a second container of software applications, wherein said first container includes a plurality of services available for use by said software applications of said first container, and wherein said second container of software applications includes a second plurality of services available for use by said software applications of said second container:
- software means for invoking security services in response to an attempt by a user, through a communication session between said user and an application within one of said containers, to gain access to a software resource that resides at a level that is higher than an operating system level; said security services including:
  - a) software means for, in response to said invoking, identifying a configuration file describing a security policy tailored for use in an environmental condition set under which said attempt arose, said identifying based upon at least a portion of said environmental condition set, said portion of said environmental condition set including said communication session's type and at least one of:
    - i) said communication session's type;
    - ii) an application program interface (API) used to access said one container;
    - iii) said one container's identity;
  - b) software means for using information found within said configuration file to engage the following for said user's access of said resource:
    - a) a login module that is used to perform login procedures for said user during an implementation of an authentication component of said security policy;
    - b) an authorization role that defines, for an authorization component of said security policy, which resources said user is permitted to reach during said session;
    - c) a user store that controls access to said resource; and,
  - c) software means for implementing said security policy against said user by using said login module, said authorization role and said user store to access said software resource that resides at a level that is higher than an operating system level.

22. The apparatus of claim 21 wherein said portion includes the identity of an application that desires access to a protected resource.

23. The apparatus of claim 21 wherein said portion includes the identity of to a component within a component based architecture.

24. The apparatus of claim 21 wherein said communication session type is one of:
  - i) an HTTP session;
  - ii) a telnet session.

25. The apparatus of claim 21 wherein said configuration file describes mappings of users to said role.

26. The apparatus of claim 21 wherein said configuration file references another configuration file, said another configuration file describing a security policy for use under a different environmental condition set.

* * * * *

UNITED STATES PATENT AND TRADEMARK OFFICE
CERTIFICATE OF CORRECTION

PATENT NO. : 7,650,627 B1 Page 1 of 1
APPLICATION NO. : 10/857075
DATED : January 19, 2010
INVENTOR(S) : Stancheva et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this

Twenty-eighth Day of December, 2010

David J. Kappos
*Director of the United States Patent and Trademark Office*